(12) United States Patent
Jensen

(10) Patent No.: US 7,739,337 B1
(45) Date of Patent: Jun. 15, 2010

(54) METHOD AND APPARATUS FOR GROUPING SPAM EMAIL MESSAGES

(75) Inventor: Sanford Jensen, Berkeley, CA (US)

(73) Assignee: Symantec Corporation, Mountain View, CA (US)

( * ) Notice: Subject to any disclaimer, the term of this patent is extended or adjusted under 35 U.S.C. 154(b) by 1389 days.

(21) Appl. No.: 11/157,327

(22) Filed: Jun. 20, 2005

(51) Int. Cl.
*G06F 15/16* (2006.01)
*G06E 1/00* (2006.01)
*G06E 3/00* (2006.01)
*G06F 15/18* (2006.01)
*G06G 7/00* (2006.01)

(52) U.S. Cl. ............... 709/206; 709/202; 706/16
(58) Field of Classification Search ................. 709/204, 709/206, 207, 202; 707/5; 706/16
See application file for complete search history.

(56) References Cited

U.S. PATENT DOCUMENTS

| | | |
|---|---|---|
| 5,121,345 A | 6/1992 | Lentz |
| 5,377,354 A | 12/1994 | Scannell et al. |
| 5,438,433 A | 8/1995 | Reifman et al. |
| 5,440,723 A | 8/1995 | Arnold et al. |
| 5,537,540 A | 7/1996 | Miller et al. |
| 5,557,789 A | 9/1996 | Mase et al. |
| 5,619,648 A | 4/1997 | Canale et al. |
| 5,634,005 A | 5/1997 | Matsuo |
| 5,649,182 A | 7/1997 | Reitz |
| 5,675,507 A | 10/1997 | Bobo, II |
| 5,678,041 A | 10/1997 | Baker et al. |
| 5,696,898 A | 12/1997 | Baker et al. |
| 5,734,826 A * | 3/1998 | Olnowich et al. ........... 709/238 |
| 5,790,789 A | 8/1998 | Suarez |
| 5,796,948 A | 8/1998 | Cohen |
| 5,802,277 A | 9/1998 | Cowlard |
| 5,809,242 A | 9/1998 | Shaw et al. |
| 5,822,527 A | 10/1998 | Post |
| 5,826,022 A | 10/1998 | Nielsen |
| 5,835,087 A | 11/1998 | Herz et al. |
| 5,845,263 A | 12/1998 | Camaisa et al. |
| 5,862,325 A | 1/1999 | Reed et al. |
| 5,864,684 A | 1/1999 | Neilsen |
| 5,870,546 A | 2/1999 | Kirsch |
| 5,870,548 A | 2/1999 | Nielsen |

(Continued)

FOREIGN PATENT DOCUMENTS

EP 0420779 4/1991

(Continued)

OTHER PUBLICATIONS

International Search Report in Application No. PCT/US2006/023847 Mailed Oct. 10, 2006.

(Continued)

*Primary Examiner*—Melanie Jagannathan
*Assistant Examiner*—Stephanie Chang
(74) *Attorney, Agent, or Firm*—Meyertons, Hood, Kivlin, Kowert & Goetzel, P.C.

(57) ABSTRACT

A method and system for grouping spam email messages are described. In one embodiment, the method includes receiving probe email messages indicative of spam and modifying the probe email messages to reduce noise. The method further includes comparing the probe email messages using fuzzy logic to identify similar email messages, and creating groups of similar email messages. Each of the created groups pertains to a distinct spam attack.

18 Claims, 7 Drawing Sheets

U.S. PATENT DOCUMENTS

| | | | |
|---|---|---|---|
| 5,874,955 | A | 2/1999 | Rogowitz et al. |
| 5,884,033 | A | 3/1999 | Duvall et al. |
| 5,889,943 | A | 3/1999 | Ji et al. |
| 5,905,863 | A | 5/1999 | Knowles et al. |
| 5,919,257 | A | 7/1999 | Trostle |
| 5,930,479 | A | 7/1999 | Hall |
| 5,956,481 | A | 9/1999 | Walsh et al. |
| 5,968,117 | A | 10/1999 | Schuetze |
| 5,978,837 | A | 11/1999 | Foladare et al. |
| 5,999,932 | A | 12/1999 | Paul |
| 5,999,967 | A | 12/1999 | Sundsted |
| 6,023,700 | A | 2/2000 | Owens et al. |
| 6,023,723 | A | 2/2000 | McCormick et al. |
| 6,052,709 | A | 4/2000 | Paul et al. ............... 709/204 |
| 6,073,165 | A | 6/2000 | Narasimhan et al. |
| 6,088,804 | A | 7/2000 | Hill et al. |
| 6,112,227 | A | 8/2000 | Heiner |
| 6,146,026 | A | 11/2000 | Ushiku |
| 6,157,630 | A | 12/2000 | Adler et al. |
| 6,158,031 | A | 12/2000 | Mack et al. |
| 6,161,130 | A | 12/2000 | Horvitz et al. |
| 6,173,364 | B1 | 1/2001 | Zenchelsky et al. |
| 6,182,118 | B1 | 1/2001 | Finney et al. |
| 6,182,227 | B1 | 1/2001 | Blair et al. |
| 6,189,026 | B1 | 2/2001 | Birrell et al. |
| 6,195,686 | B1 | 2/2001 | Moon et al. |
| 6,199,102 | B1 | 3/2001 | Cobb |
| 6,216,165 | B1 | 4/2001 | Woltz et al. |
| 6,226,630 | B1 | 5/2001 | Billmers |
| 6,230,156 | B1 | 5/2001 | Hussey |
| 6,266,774 | B1 | 7/2001 | Sampath et al. |
| 6,272,641 | B1 | 8/2001 | Ji |
| 6,314,454 | B1 | 11/2001 | Wang et al. |
| 6,327,610 | B2 | 12/2001 | Uchida et al. |
| 6,330,588 | B1 | 12/2001 | Freeman |
| 6,334,140 | B1 | 12/2001 | Kawamata |
| 6,360,254 | B1 | 3/2002 | Linden et al. |
| 6,377,949 | B1 | 4/2002 | Gilmour |
| 6,393,568 | B1 | 5/2002 | Ranger et al. |
| 6,411,947 | B1 | 6/2002 | Rice et al. |
| 6,421,709 | B1 | 7/2002 | McCormick et al. |
| 6,438,125 | B1 | 8/2002 | Brothers |
| 6,438,608 | B2 | 8/2002 | Biliris et al. |
| 6,466,966 | B1 | 10/2002 | Kirsch et al. |
| 6,505,237 | B2 | 1/2003 | Beyda et al. |
| 6,523,120 | B1 | 2/2003 | Strasnick |
| 6,546,416 | B1 | 4/2003 | Kirsch |
| 6,549,957 | B1 | 4/2003 | Hanson et al. |
| 6,571,275 | B1 | 5/2003 | Dong et al. |
| 6,640,301 | B1* | 10/2003 | Ng ............... 713/156 |
| 6,654,787 | B1* | 11/2003 | Aronson et al. ........ 709/206 |
| 6,671,812 | B1 | 12/2003 | Balasubramaniam et al. |
| 6,718,321 | B2 | 4/2004 | Birrell et al. |
| 6,732,157 | B1* | 5/2004 | Gordon et al. ........ 709/206 |
| 6,757,713 | B1 | 6/2004 | Ogilvie et al. |
| 6,785,732 | B1 | 8/2004 | Bates et al. |
| 6,792,543 | B2 | 9/2004 | Pak et al. |
| 6,836,272 | B2 | 12/2004 | Leung et al. |
| 6,859,833 | B2 | 2/2005 | Kirsch et al. |
| 6,901,398 | B1* | 5/2005 | Horvitz et al. ......... 709/206 |
| 7,010,698 | B2 | 3/2006 | Sheymov |
| 7,051,077 | B2* | 5/2006 | Lin ................ 709/207 |
| 7,072,944 | B2 | 7/2006 | Lalonde et al. |
| 7,093,121 | B2 | 8/2006 | Barton et al. |
| 7,096,500 | B2 | 8/2006 | Roberts et al. |
| 7,114,177 | B2 | 9/2006 | Rosenberg et al. |
| 7,257,564 | B2* | 8/2007 | Loughmiller et al. ...... 706/16 |
| 7,272,853 | B2 | 9/2007 | Goodman et al. |
| 7,315,893 | B2 | 1/2008 | Vinberg |
| 7,331,062 | B2 | 2/2008 | Alagna et al. |
| 7,395,657 | B2 | 7/2008 | Johnson |
| 7,451,487 | B2 | 11/2008 | Oliver et al. |
| 2002/0007301 | A1 | 1/2002 | Reuning |
| 2002/0046065 | A1 | 4/2002 | Nighan |
| 2002/0116635 | A1 | 8/2002 | Sheymov |
| 2002/0147780 | A1 | 10/2002 | Liu et al. |
| 2002/0150243 | A1 | 10/2002 | Craft et al. |
| 2002/0174137 | A1 | 11/2002 | Wolff et al. |
| 2003/0023722 | A1 | 1/2003 | Vinberg |
| 2003/0033536 | A1 | 2/2003 | Pak et al. |
| 2003/0097451 | A1 | 5/2003 | Bjorksten et al. |
| 2003/0159070 | A1 | 8/2003 | Mayer et al. |
| 2003/0174137 | A1 | 9/2003 | Leung et al. |
| 2003/0236844 | A1* | 12/2003 | Kaler et al. ............ 709/206 |
| 2004/0054917 | A1 | 3/2004 | Obrecht et al. |
| 2004/0064736 | A1 | 4/2004 | Obrecht et al. |
| 2004/0078422 | A1 | 4/2004 | Toomey |
| 2004/0083270 | A1* | 4/2004 | Heckerman et al. ........ 709/207 |
| 2004/0088570 | A1 | 5/2004 | Roberts et al. |
| 2004/0098607 | A1 | 5/2004 | Alagna et al. |
| 2004/0123157 | A1 | 6/2004 | Alagna et al. |
| 2004/0177120 | A1 | 9/2004 | Kirsch et al. |
| 2004/0187023 | A1 | 9/2004 | Alagna et al. |
| 2004/0230820 | A1 | 11/2004 | Hui Hsu et al. |
| 2005/0050222 | A1 | 3/2005 | Packer |
| 2005/0060643 | A1 | 3/2005 | Glass et al. ............ 715/205 |
| 2005/0081059 | A1 | 4/2005 | Bandini et al. |
| 2005/0108339 | A1* | 5/2005 | Gleeson et al. ........ 709/206 |
| 2005/0108340 | A1* | 5/2005 | Gleeson et al. ........ 709/206 |
| 2005/0132197 | A1* | 6/2005 | Medlar ............... 713/176 |
| 2005/0137980 | A1 | 6/2005 | Bullock et al. |
| 2006/0031298 | A1 | 2/2006 | Hasegawa |
| 2006/0053490 | A1 | 3/2006 | Herz et al. |
| 2006/0168006 | A1* | 7/2006 | Shannon et al. ........ 709/206 |
| 2006/0251068 | A1 | 11/2006 | Judge et al. |
| 2006/0288076 | A1 | 12/2006 | Cowings et al. |
| 2007/0143432 | A1 | 6/2007 | Klos et al. |

FOREIGN PATENT DOCUMENTS

| | | |
|---|---|---|
| EP | 0375138 | 6/1996 |
| EP | 0720333 | 7/1996 |
| GB | 2271002 | 3/1994 |
| JP | 10240649 | 11/1998 |
| WO | 9635994 | 11/1996 |
| WO | 9837680 | 8/1998 |
| WO | WO 01/53965 | 7/2001 |
| WO | 0203178 | 1/2002 |
| WO | 02103533 | 12/2002 |
| WO | 2004021197 | 3/2004 |
| WO | 2004055632 | 7/2004 |
| WO | 2004072777 | 8/2004 |

OTHER PUBLICATIONS

Rubin P:, Re: Spam (hash codes), Feb. 20, 1995 NETCOM On-line Communication Services.

Clark et al., "PCMAIL: A Distributed Mail System for Personal Computers," May 1986, MIT Laboratory for Computer Science, 28 Pages (1-28).

U.S. Appl. No. 10/117,065, entitled "Apparatus and Method for Weighted and Aging Spam Filtering Rules," by Sunil Paul, et al., filed Apr. 4, 2002.

U.S. Appl. No. 10/871,583, entitled "System and Method for Filtering Spam Messages Utilizing URL Filtering Module," by Cowings, et al., filed Jun. 17, 2004.

U.S. Appl. No. 10/949,465, entitled "System and Method for Filtering Fraudulent Email Messages," by Bruno, et al., filed Sep. 24, 2004.

U.S. Appl. No. 11/048,958, entitled "Method and Apparatus for Determining the Source of an Email Message," by Mantel, filed Feb. 1, 2005.

U.S. Appl. No. 11/157,327, entitled "Method and Apparatus for Grouping Spam Email Messages," by Jensen, filed Jun. 20, 2005.

U.S. Appl. No. 11/127,813, entitled "Method and Apparatus for Simulating End User Responses to Spam Email Messages," by Khalsa, et al., filed May 11, 2005.

U.S. Appl. No. 11/116,572, entitled "Method and Apparatus for Creating Aggressive Anti-Spam Rules," by Chin, et al., filed Apr. 27, 2005.

Harker, R., "Selectively Rejecting Spam Using Sendmail," Proceedings of the Eleventh Systems Administration Conference, abstract only, Oct. 1997.

Gaskin, J.E., "Don't Get Spammed," Information Week, Aug. 18, 1997, retrieved from Internet: http://www.informationweek.com/644/44olspm.htm, 9 pages.

Ranum, M.J. et al., "Implementing a Generalized Tool for Network Monitoring," Proceedings of the Eleventh Systems Administration Conference (LISA XI), San Diego, CA, Oct. 26-31, 1997, pp. 1-8.

Kaufman, et al., "Network Security: Private Communication in a Public World—Revocation—Section 15.4," 2nd Edition, Prentice Hall Series in Computer Networking and Distributed Systems, 2002, 4 pages.

* cited by examiner

1 => FIRST ATTACK
2 => SECOND ATTACK
3 => NOT IN 1 OR 2 BUT OVERLAPS
6 => IN 1 AND 3

METHOD AND APPARATUS FOR GROUPING SPAM EMAIL MESSAGES

FIELD OF THE INVENTION

The present invention relates to filtering electronic mail (email); more particularly, the present invention relates to creating filters to detect email spam.

BACKGROUND OF THE INVENTION

In recent years, spam has become a major problem for all Internet users. As the cost of processing power, email address acquisition and email software continue to fall, spam becomes increasingly cost-effective for spammers. Given the negligible cost involved in sending millions of unsolicited email messages, spammers need only capture a small response rate to make a profit. The growth trend of spam shows no sign of abating. According to recent statistics, spam currently accounts for over half of all email traffic in the U.S. This increase in both the volume and percentage of spam is not only worsening a resource drain for IT, it is also affecting how end users view email, which has become the primary form of communication in the enterprise.

Presently, there are products for filtering out unwanted email messages. However, these products typically fail to effectively compensate for the escalating volumes of spam.

SUMMARY OF THE INVENTION

A method and system for grouping spam email messages are described. According to one aspect, the method includes receiving probe email messages indicative of spam and modifying the probe email messages to reduce noise. The method further includes comparing the probe email messages using fuzzy logic to identify similar email messages, and creating groups of similar email messages. Each of the created groups pertains to a distinct spam attack.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
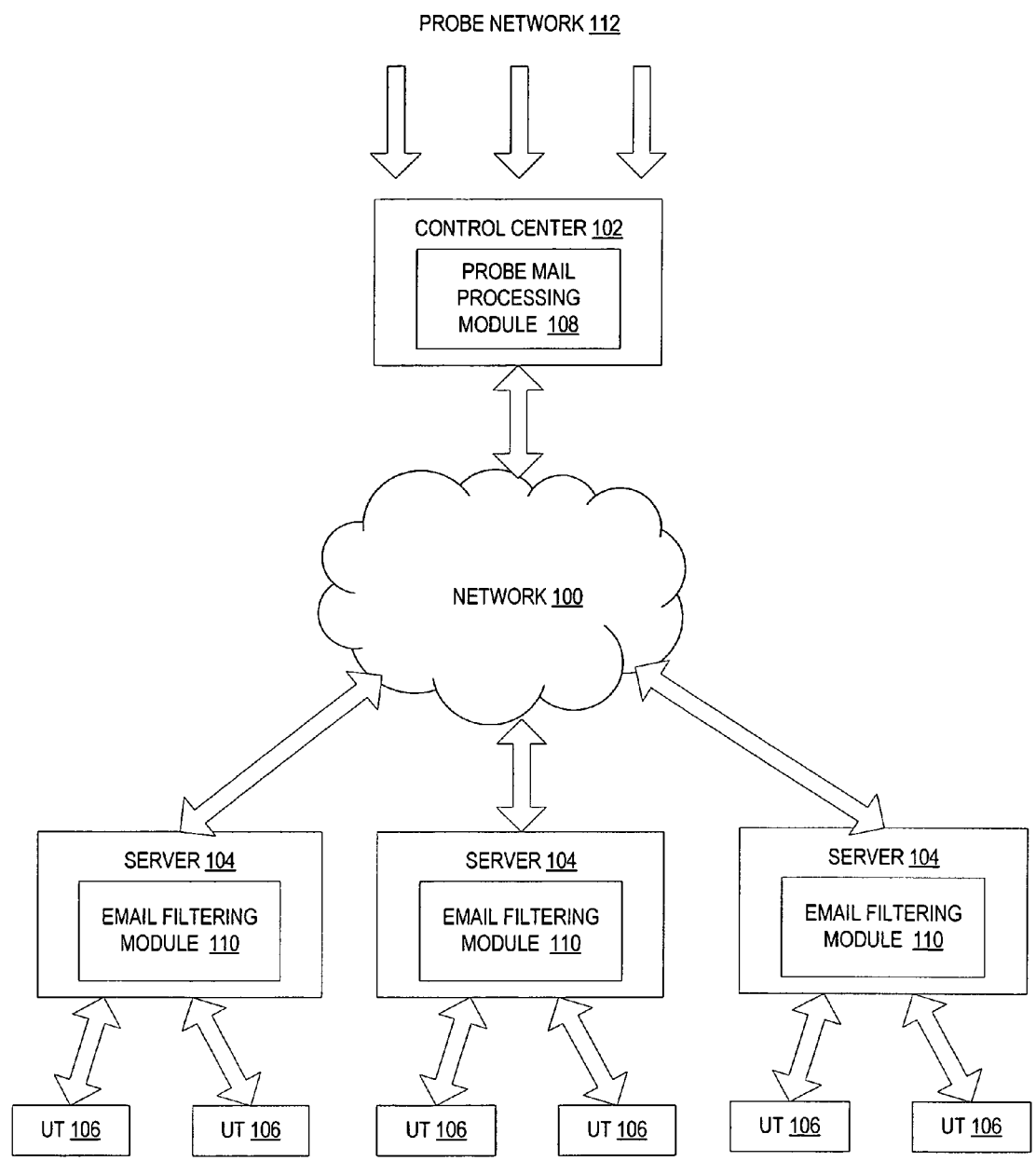
FIG. 1 is a block diagram of one embodiment of a system for controlling delivery of spam electronic mail.

A method and apparatus for grouping spam email messages are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a system for controlling delivery of spam electronic mail (email). The system includes a control center 102 coupled to a communications network 100 such as a public network (e.g., the Internet, a wireless network, etc.) or a private network (e.g., LAN, Intranet, etc.). The control center 102 communicates with multiple network servers 104 via the network 100. Each server 104 communicates with user terminals 106 using a private or public network.

The control center 102 is an anti-spam facility that is responsible for analyzing messages indicative of spam, developing filtering rules for detecting spam, and distributing the filtering rules to the servers 104. A message may be indicative of spam because it was collected via a "probe network" 112. In one embodiment, the probe network is formed by fictitious probe email addresses specifically selected to make their way into as many spammer mailing lists as possible. The fictitious probe email addresses may also be selected to appear high up on spammers' lists in order to receive spam mailings early in the mailing process (e.g., using the e-mail address "aardvark@aol.com" ensures relatively high placement on an alphabetical mailing list). The fictitious probe email addresses may include, for example, decoy accounts and expired domains. In addition, a certain percentage of assignable e-mail addresses offered by an ISP or private network may be reserved for use as probe email addresses. The probe network 112 may also receive email identified as spam by users of terminals 106.

A server 104 may be a mail server that receives and stores messages addressed to users of corresponding user terminals. Alternatively, a server 104 may be a different server (e.g., a gateway of an Internet Service Provider (ISP)) coupled to a mail server. Servers 104 are responsible for filtering incoming messages based on the filtering rules received from the control center 102. Servers 104 operate as clients receiving services of the control center 102.

In one embodiment, the control center 102 includes a probe mail processing module 108 that is responsible for identifying spam email messages resulted from distinct spam attacks, generating filters for the distinct spam attacks, and distributing the filters to the servers 104 for detection of spam email resulted from these spam attacks at the customer sites.

Each server 104 includes an email filtering module 110 that is responsible for storing filters received from the control center 102 and detecting spam email using these filters.

In an alternative embodiment, each server 104 hosts both the probe mail processing module 108 that generates spam filters and the email filtering module 110 that uses the generated filters to detect spam email.

Figure 2:
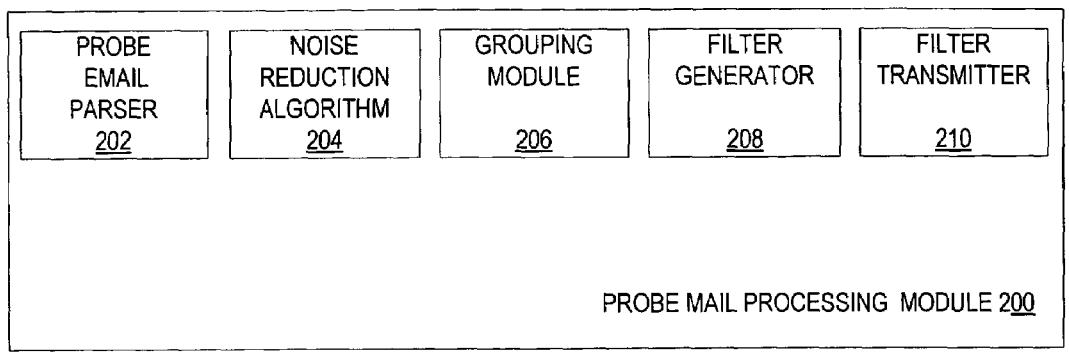
FIG. 2 is a block diagram of one embodiment of a probe mail processing module.

FIG. 2 is a block diagram of one embodiment of a probe mail processing module 200. The probe mail processing module 200 includes a probe email parser 202, a noise reduction algorithm 204, a grouping module 206, a filter generator 208 and a filter transmitter 210.

The probe email parser 202 is responsible for parsing the body of probe email messages.

The noise reduction algorithm 204 is responsible for detecting data indicative of noise and removing noise from probe email messages. Noise represents data invisible to a recipient that was added to an email message to hide its spam nature. Such data may include, for example, formatting data (e.g., HTML tags), numeric character references, character entity references, URL data of predefined categories, etc. Numeric character references specify the code position of a character in the document character set. Character entity references use symbolic names so that authors need not remember code positions. For example, the character entity reference "å" refers to the lowercase "a" character topped with a ring. Predefined categories of URL data may include, for example, numerical character references contained in the URL and the URL "password" syntax data that adds characters before an "@" in the URL hostname.

The grouping module 206 is responsible for grouping probe email messages that are likely to result from distinct spam attacks. The grouping module 206 compares probe email messages or their portions (e.g., message headers, message bodies (or portions of message body), message senders, or any combination of the above) to find similar probe email messages. The comparison may be done using regular expressions or mathematical signatures of probe email messages. Mathematical signatures of probe email messages may consist of checksums, hash values or some other data identifying the message content, and may be created using various algorithms that enable the use of similarity measures in comparing different email messages.

The filter generator 208 is responsible for generating filters for individual groups created by the grouping module 206. A filter may include a mathematical signature of a probe email message, a regular expression characterizing a probe email message, one or more URLs extracted from a probe email message, or any other data characterizing probe email messages resulted from a spam attack.

The filter transmitter 210 is responsible for distributing filters to participating servers such as servers 104 of FIG. 1. In one embodiment, each server 104 periodically (e.g., each 5 minutes) initiates a connection (e.g., a secure HTTPS connection) with the call center 102. Using this pull-based connection, filters are transmitted from the call center 102 to the relevant server 104 for detection of spam email at relevant customer sites.

Figure 3:
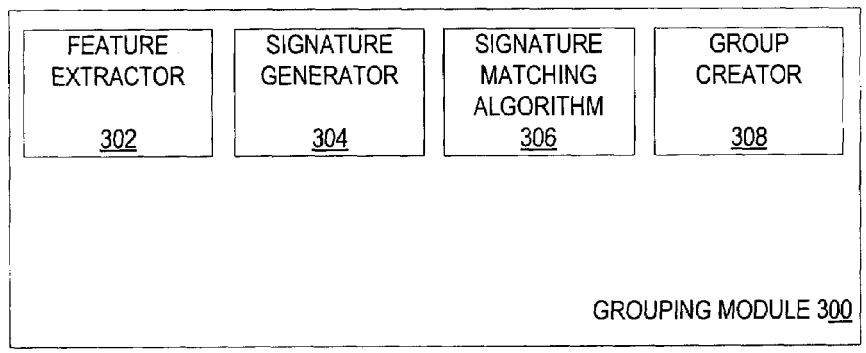
FIG. 3 is a block diagram of one embodiment of a grouping module.

FIG. 3 is a block diagram of one embodiment of a grouping module 300. The grouping module 300 includes a feature extractor 302, a signature generator 304, a signature matching algorithm 306, and a group creator 308.

The feature extractor 302 is responsible for determining the size of probe email messages and expanding a probe email message if its size is below a threshold. In particular, if the feature extractor 302 determines that the size of an email message is below a threshold, it identifies a predefined feature in the probe email message and appends this feature to the probe email message to increase its size. The feature may be appended to the probe email message several times until the size of the probe email message reaches a threshold. The feature may be any data contained in the message that characterizes the content of the message or its sender or recipient. For example, the feature may be a URL, a telephone number, a keyword, a company name or a person's name.

The signature generator 304 is responsible for generating mathematical signatures for probe email messages. The signature generator 304 may generate mathematical signatures using various algorithms that enable the use of similarity measures in comparing different email messages. For example, the signature generator 304 may generate mathematical signatures using the MD5 algorithm or a character-based algorithm that extracts from a message the most frequently occurring combinations of characters.

The signature matching algorithm 306 is responsible for comparing signatures of probe email messages to identify similar probe email messages. In one embodiment, the signature matching algorithm 306 operates using fuzzy logic to not only identify matching probe email messages but also probe email message that are significantly similar and, therefore, are likely to have been originated from the same spam attack.

The group creator 308 is responsible for grouping similar probe email messages into groups corresponding to distinct spam attacks.

The grouping module 300 operates in real time, efficiently grouping a large number of probe email messages (e.g., several million messages per day) to identify spam attacks at an early stage and allow for creation of filters that detect spam email messages resulting from these spam attacks at the customer sites.

Figure 4:
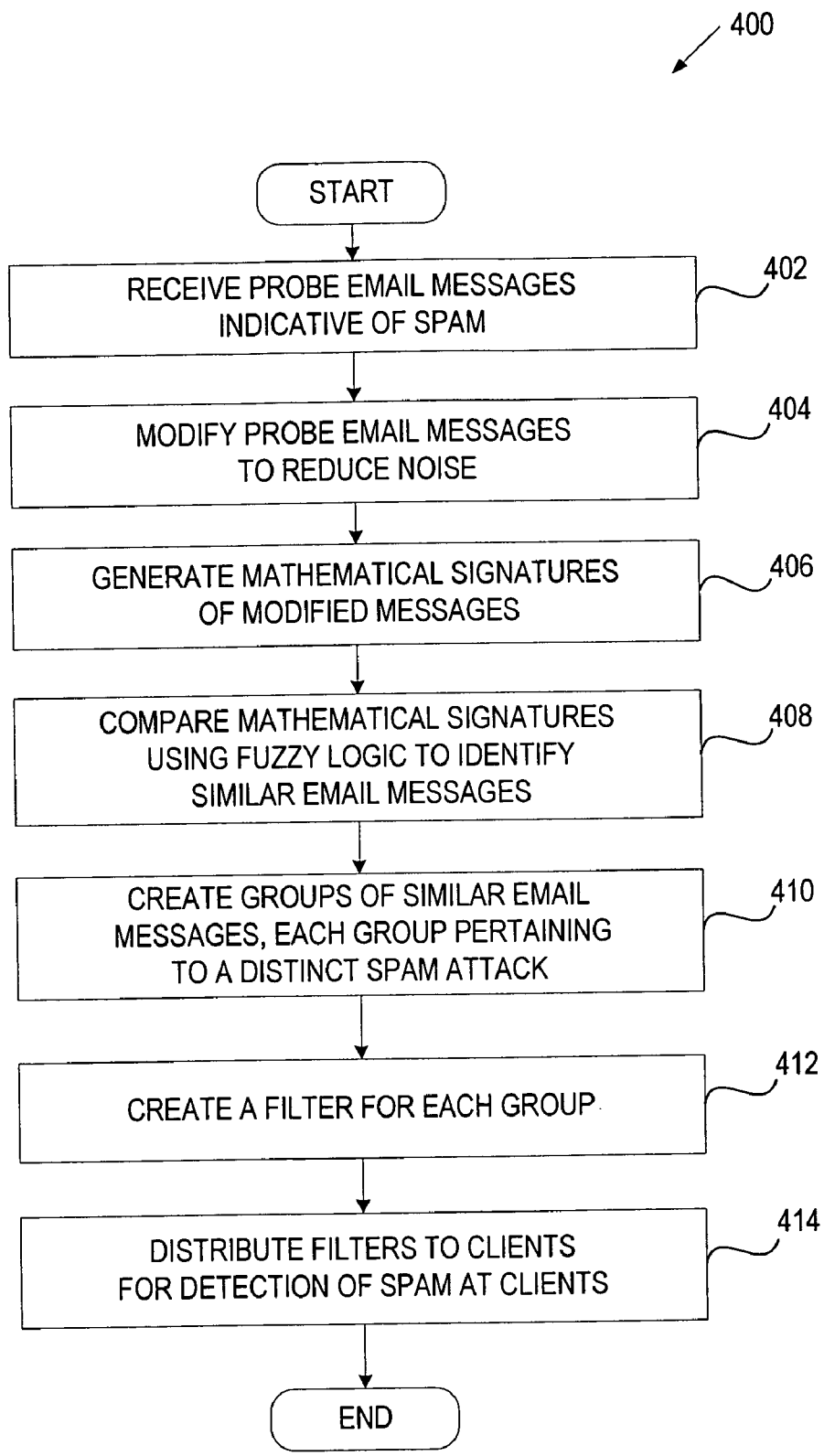
FIG. 4 is a flow diagram of one embodiment of a process for facilitating detection of spam email messages.

FIG. 4 is a flow diagram of one embodiment of a process 400 for facilitating detection of spam email messages. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 4, process 400 begins with processing logic receiving probe email messages indicative of spam (processing block 402). Probe email messages are indicative of spam because they are collected via a probe network.

At processing block 404, processing logic modifies the probe email messages to reduce noise. In one embodiment, processing logic modifies the probe email messages by removing formatting data, translating numeric character references and character entity references to their ASCII (American Standard Code for Information Interchange) equivalents, and modifying URL data of predefined categories. In one embodiment, formatting data is removed if it does not qualify as an exception. Typically, HTML formatting does not add anything to the information content of a message. However, a few exceptions exist. These exceptions are the tags that contain useful information for further processing of the message (e.g., tags <BODY>, <A>, <IMG>, and <FONT>). For example, the <FONT> and <BODY> tags are needed for "white on white" text elimination, and the <A> and <IMG> tags typically contain link information that may be used for passing data to other components of the system.

In one embodiment, processing logic modifies URL data of predefined categories by removing numerical character references contained in the URL, removing additional characters added before an "@" in the URL hostname, and removing the "query" part of the URL, following a string "?" at the end of the URL.

At processing block 406, processing logic generates mathematical signatures of the modified probe messages. Mathematical signatures of probe email messages may consist of checksums, hash values or some other data identifying the message content, and may be created using various algorithms that enable the use of similarity measures in comparing different email messages. In one embodiment, a mathematical signature for an email message is created using a character-based mechanism that identifies the most frequently used character combinations in a document. This mechanism may use an ASCII character set based on the Roman alphabet or an extended character set that also includes non-ASCII characters to cover international email messages using non-Roman alphabets (e.g., Cyrillic alphabet, Greek alphabet, Arabic alphabet, etc.). One embodiment of a process for creating a mathematical signature of a document will be discussed in more detail below in conjunction with FIG. 7.

In one embodiment, if a probe email message is small (e.g., if the size of the message is below a threshold), processing logic expands the size of the email message prior to generating a mathematical signature. The size may be expanded by repeatedly appending to the email messages an important feature extracted from the email message. Such a feature may be a URL, a telephone number, a keyword or a name contained in the email messages. One embodiment of a process for grouping small message will be discussed in more detail below in conjunction with FIG. 5.

At processing block 408, processing logic compares the mathematical signatures of probe email messages using fuzzy logic to identify similar probe email messages. One embodiment of a process for finding similar email messages will be discussed in more detail below in conjunction with FIG. 6.

At processing block 410, processing logic creates groups of similar email messages. Each group contains email messages that have likely been originated from a distinct spam attack.

At processing block 412, processing logic creates a filter for each group of email messages. Each filter is intended to detect spam resulting from a corresponding spam attack at the customer sites. A filter may include a mathematical signature of a probe email message, a regular expression characterizing a probe email message, one or more URLs extracted from a probe email message, or any other data characterizing a probe email message.

At processing block 414, processing logic distributes the filters to the clients for detection of spam at the customer sites.

Figure 5:
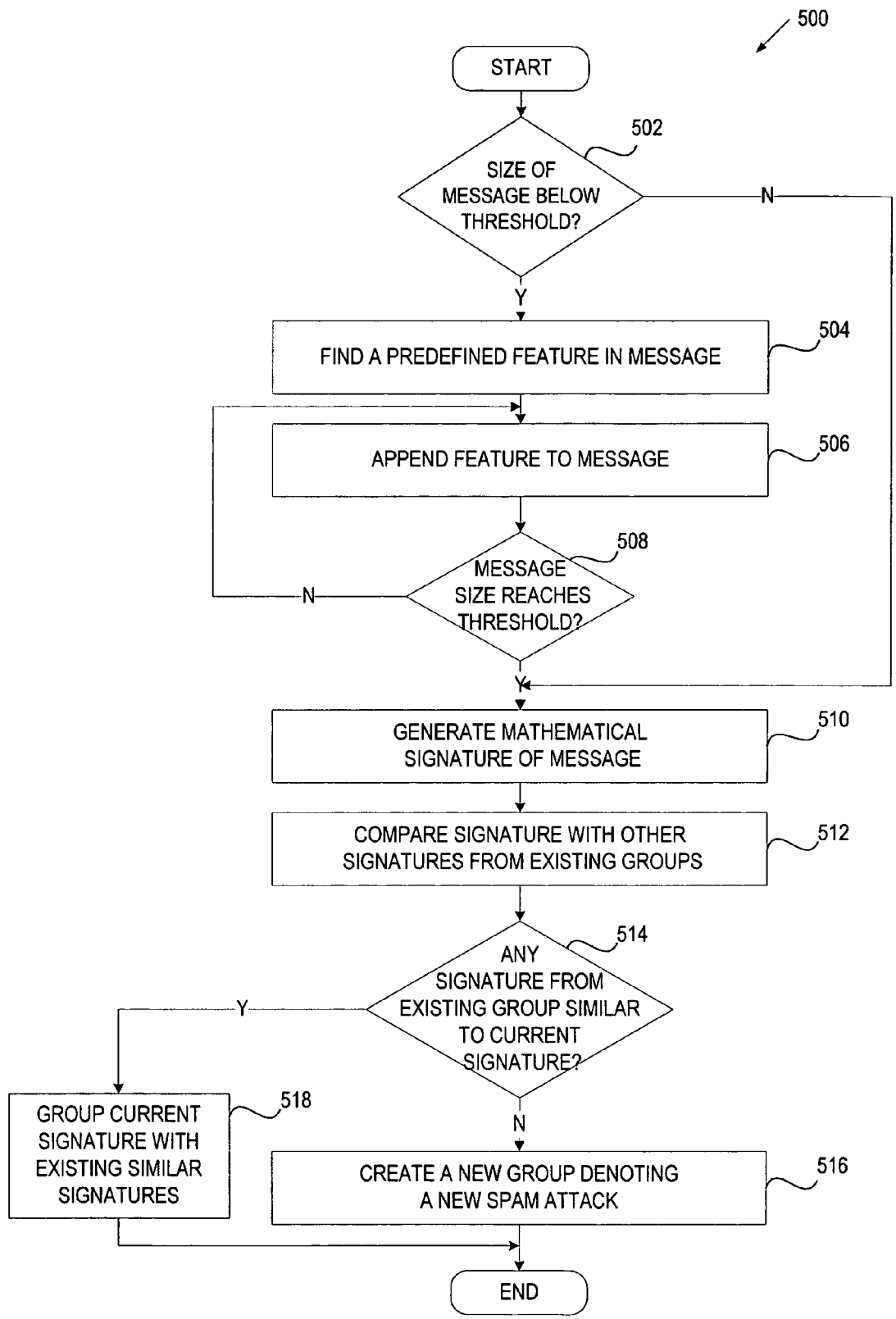
FIG. 5 is a flow diagram of one embodiment of a process for grouping messages.

FIG. 5 is a flow diagram of one embodiment of a process 500 for grouping messages. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 5, process 500 begins with processing logic determining whether the size of a new message is below a threshold (processing block 502). A new message may be an email message or any other message or document in electronic form. A threshold may be a minimum message size that enables a meaningful comparison of similarities in messages. If the size of the new message is equal to, or exceeds, the threshold, processing logic proceeds to processing box 510. Otherwise, if the size of the new message is below the threshold, processing logic proceeds to processing box 504.

At processing box 504, processing logic finds a predefined feature in the new message. In one embodiment, the predefined feature is a URL. Alternatively, the predefined feature may refer to any other data that is known to be an important part of the message content. For example, the predefined feature may be a telephone number, a keyword, a company name, a name of a person, etc.

At processing block 506, processing logic appends the predefined feature to the message. In one embodiment, in which the predefined feature is a URL, processing logic extracts top-level information from each URL found in the message and adds the extracted data to the end of the message. For example, processing logic may extract from each URL a host name (e.g., www.google.com), ignoring randomized sub-domains, redirections to target URLs, randomized paths, etc.

At processing block 508, processing logic determines whether the size of the expanded message reaches the threshold. If not, processing logic repeats the addition of the extracted feature to the message (processing block 506) until the message size reaches the threshold. When the message size reaches the threshold, processing logic proceeds to processing block 510.

At processing block 510, processing logic generates a mathematical signature of the new message. One embodiment of a process for creating a mathematical signature of a message will be discussed in more detail below in conjunction with FIG. 7.

Next, processing logic compares the signature of the new message with signatures of other messages from the existing groups (processing block 512) and determines whether the signature of the new message is similar to any other signatures (processing block 514). If so, processing logic groups the signature of the new message with the similar signatures (processing block 518). If not, processing logic creates a new group for this signature that denotes a new spam attack (processing block 516).

Figure 6:
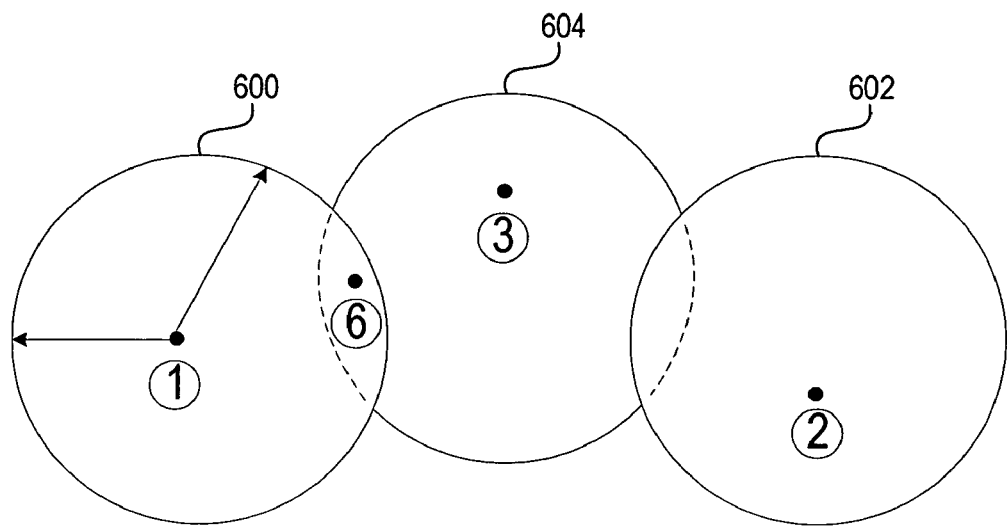
FIG. 6 illustrates a process of grouping messages using fuzzy logic, according to one embodiment of the present invention.

FIG. 6 illustrates a process of grouping messages using fuzzy logic, according to one embodiment of the present invention.

Referring to FIG. 6, signature 1 is a mathematical signature of a probe email message initially received by the control center 102. Group 1 contains signature 1 and corresponds to a first spam attack characterized by space 600. Space 600 defines an allowable degree of similarity between signatures of group 1.

Group 2 contains signature 2 and corresponds to a second spam attack characterized by space 602.

Group 3 contains signature 3 and corresponds to a third spam attack characterized by space 604. Space 604 overlaps with spaces 600 and 602.

Subsequently, when signatures of newly received messages are compared with existing signatures, they are grouped depending on their similarities with the existing signatures. If a signature is similar to signatures from multiple groups, it is assigned to the oldest group (i.e., the group that was created earlier than the other group or groups). For example, signature 6 belongs both to space 600 and space 604. Because group 1 was created before group 3, signature 6 is assigned to group 6.

Figure 7:
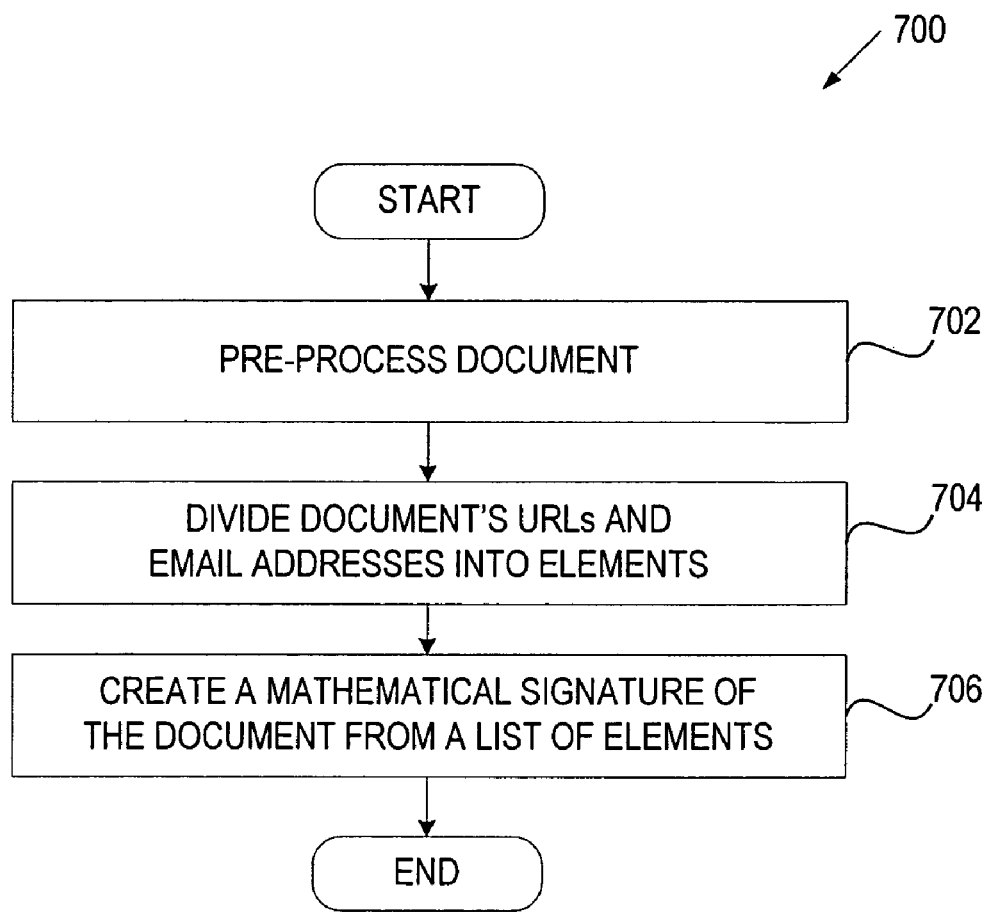
FIG. 7 is a flow diagram of one embodiment of a process for generating mathematical signatures of documents.

FIG. 7 is a flow diagram of one embodiment of a process 700 for generating a mathematical signature of a document. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 7, process 700 begins with processing logic pre-processing a document (processing block 702). In one embodiment, the document is pre-processed by identifying all URLs and email addresses with the document.

At processing block 704, processing logic divides these URLs and email addresses into elements. Each element is a combination of two or more portions of a relevant URL or email address. For example, an email message may contain the URL "http://www.fake-domain.com/place.html" and the email address "user@badguy.com". The URL may be divided into "http://www.fake-domain.com", "www.fake-domain.com", "fake-domain.com" and "place.html". The email address may be divided into "user@badguy.com" and "badguy.com".

At processing block 706, processing logic creates a mathematical signature of the document by compiling the elements created at processing block 704 into a list. In one embodiment, the elements are listed in the descending or ascending order. In the example above, the mathematical signature may include a list of elements resulting from the URL and the email address.

Subsequently, the mathematical signature of the document may be compared with other signatures. In one embodiment, the signature is considered sufficiently similar with some other signature if the two signatures include a certain number or percentage of the same list elements. For example, a signature created for a message containing the URL "http://www.fake-domain.com/otherplace.html" and the email address "otheruser@badguy.com" may be considered sufficiently similar with the signature of the referenced-above message that contains the URL "http://www.fake-domain.com/place.html" and the email address "user@badguy.com" because the two signatures include 4 common list elements (about 67 percent).

It should be noted that a signature can be created for the message body only, the message header only, a combination of the message body and header, a combination of the message body and some other data (e.g., recipient or sender information), or a combination of the message header and some other data (e.g., recipient or sender information).

It will be understood by one of ordinary skill in the art that various techniques other than those described above may be used by embodiments of the present invention to generate mathematical signatures of email message.

An Exemplary Computer System

Figure 8:
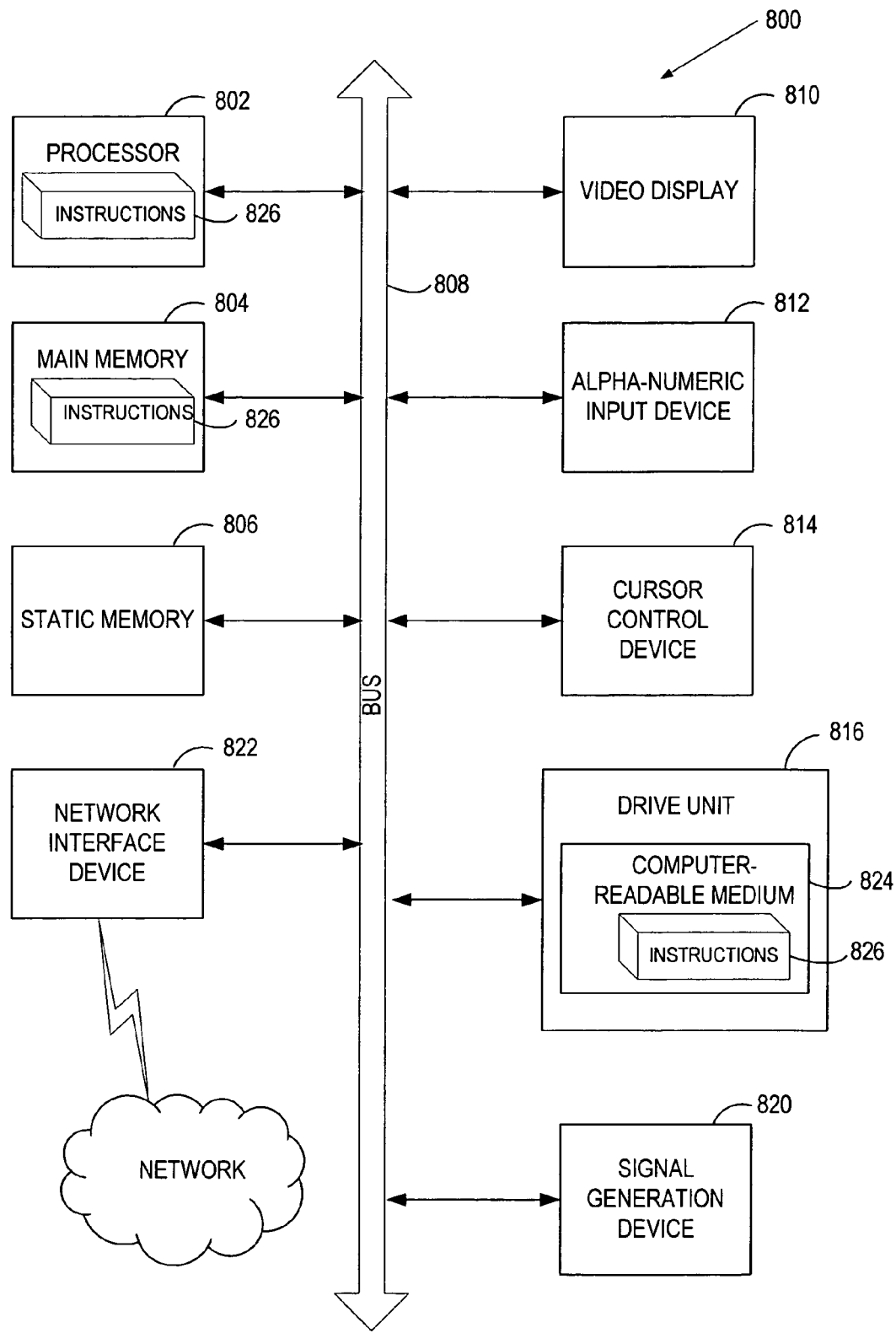
FIG. 8 is a block diagram of an exemplary computer system.

FIG. 8 is a block diagram of an exemplary computer system 800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
   receiving, at a computer system, a plurality of spam email messages;
   for at least one received spam email message having a size less than a threshold:
     the computer system finding a feature in the spam email message;
     the computer system repeatedly adding the feature to the spam email message until its size reaches the threshold;
   the computer system subsequently performing comparisons involving the spam email messages to identify similar spam email messages;
   the computer system creating a first group of spam email messages and a second group of spam email messages, wherein messages in the first group are similar to one another and pertain to a first type of spam attack, and wherein messages in the second groups are similar to one another and pertain to a second type of spam attack distinct from the first type of spam attack;
   the computer system creating a filter for one or more of the first and second groups; and
   the computer system distributing the created filters to a plurality of client computer systems for detection of spam email messages.

2. The method of claim 1 wherein the spam email messages are collected using a plurality of fictitious probe email addresses selected to appear on spam email mailing lists.

3. The method of claim 1 further comprising the computer system removing data indicative of noise from the spam email messages, the data indicative of noise being selected from the group consisting of formatting data, numeric character references, character entity references, and uniform resource locator (URL) data including password syntax data.

4. The method of claim 1 wherein the feature is a uniform resource locator (URL).

5. The method of claim 1 wherein the feature is a phone number.

6. The method of claim 1 wherein the feature is a keyword or a name.

7. A method comprising:
   a computer system determining that a size of a newly received spam message is below a threshold;
   the computer system finding a feature in the new spam message;
   the computer system adding on the feature to the new spam message until the size of the new spam message reaches the threshold;
   upon the new spam message reaching the threshold, the computer system grouping the new spam message into an existing spam message group or a new spam message group;
   the computer system creating a filter for the group into which the new spam message has been grouped; and
   the computer system distributing the created filter to one or more client computer systems for detection of spam email messages.

8. The method of claim 7 wherein the new spam message is a probe email message collected using one of a plurality of fictitious probe email addresses selected to appear on spam email mailing lists.

9. The method of claim 7 further comprising:
   the computer system removing data indicative of noise from the new spam message prior to determining that the size of the new spam message is below the threshold, the data indicative of noise being selected from the group consisting of formatting data, numeric character references, character entity references, and uniform resource locator (URL) data including password syntax data.

10. The method of claim 7 wherein the feature is a uniform resource locator (URL).

11. The method of claim 7 wherein the feature is a phone number, a keyword, or a name.

12. A system comprising:
    a processor;
    a memory storing program instructions that are executable by the processor to:
      receive a plurality of spam email messages;
      for one or more of those received spam email message having a size below a predetermined threshold;
        find a feature in the spam email message;
        append the feature to the spam email messages until its size reaches the predetermined threshold;
      subsequently compare the spam email messages to identify similar spam email messages;
      create at least two groups of spam email messages, wherein the spam email messages in each of the at least two groups are similar to other spam email messages in that group, and wherein each of the groups pertains to a distinct spam attack;
      create a filter for one or more of the at least two groups; and
      distribute resulting filters to a plurality of client computer systems for detection of spam email messages.

13. The system of claim 12 wherein the feature is a uniform resource locator (URL).

14. The system of claim 12 wherein the feature is a phone number.

15. The system of claim 12 wherein the feature is a keyword or a name.

16. The system of claim 12 wherein the spam email messages are collected using a plurality of fictitious probe email addresses selected to appear on spam email mailing lists.

17. An apparatus comprising:
    means for receiving a plurality of spam email messages;
    means for repeatedly adding content to each of those received spam email messages having sizes less than a threshold, wherein the content added to a given received spam email message includes a feature found in that message;
    means for subsequently creating a group of similar ones of the received spam email messages;
    means for creating a filter for the group of similar spam email messages; and
    means for distributing the filter to one or more client computer systems for detection of spam email messages.

18. A computer readable medium comprising executable instructions which when executed on a processing system cause said processing system to perform a method comprising:

receiving a plurality of spam email messages;

for each of one or more of those spam email messages having a size less than a predetermined threshold, adding a feature found in the spam email message to the spam email message until its size reaches the threshold;

subsequently placing spam email messages in the received plurality of spam email messages into one of a plurality of groups, wherein spam email messages in a given one of the plurality of groups are similar to one another;

creating a filter for one or more of the plurality of groups; and distributing the created one or more filters to a plurality of client computer systems for detection of spam email messages.

* * * * *